(12) United States Patent
Tanaka et al.

(10) Patent No.: US 7,387,922 B2
(45) Date of Patent: Jun. 17, 2008

(54) LASER IRRADIATION METHOD, METHOD FOR MANUFACTURING SEMICONDUCTOR DEVICE, AND LASER IRRADIATION SYSTEM

(75) Inventors: Koichiro Tanaka, Atsugi (JP); Atsuo Isobe, Atsugi (JP); Tomoaki Moriwaka, Atsugi (JP)

(73) Assignee: Semiconductor Energy Laboratory Co., Ltd., Kanagawa-ken (JP)

( * ) Notice: Subject to any disclaimer, the term of this patent is extended or adjusted under 35 U.S.C. 154(b) by 574 days.

(21) Appl. No.: 10/749,505

(22) Filed: Jan. 2, 2004

(65) Prior Publication Data

US 2004/0140297 A1    Jul. 22, 2004

(30) Foreign Application Priority Data

Jan. 21, 2003    (JP)    ............................. 2003-012147

(51) Int. Cl.
*H01L 21/322*    (2006.01)
*H01L 21/324*    (2006.01)
(52) U.S. Cl. .................. 438/166; 438/487; 438/795
(58) Field of Classification Search ................ 438/166, 438/487, 795
See application file for complete search history.

(56) References Cited

U.S. PATENT DOCUMENTS

| | | | |
|---|---|---|---|
| 4,339,177 | A | 7/1982 | March |
| 4,692,191 | A | 9/1987 | Maeda et al. |
| 4,789,242 | A | 12/1988 | Takagi et al. |
| 4,861,964 | A | 8/1989 | Sinohara |
| 4,879,451 | A | 11/1989 | Gart |
| 5,084,888 | A | 1/1992 | Tajima et al. |
| RE33,947 | E | 6/1992 | Shinohara |

(Continued)

FOREIGN PATENT DOCUMENTS

CN    1267906    9/2000

(Continued)

OTHER PUBLICATIONS

Office Action (U.S. Appl. No. 200410007410.5) Dated Jul. 6, 2007.

*Primary Examiner*—M. Wilczewski
(74) *Attorney, Agent, or Firm*—Eric J. Robinson; Robinson Intellectual Property Law Office, P.C.

(57) ABSTRACT

In a laser irradiation system, since a heavy scanning stage moves at a high speed, vibration is caused. When the vibration is transmitted to a vibration isolator where an optical system that forms a beam spot and a system are mounted, a laser irradiation track formed on a substrate, which is not linear any more, is undulating in a reflection of the vibration. It is one of the objects of the present invention to suppress the undulation of the irradiation tracks due to such vibration. A light-shielding film 134 is provided over a semiconductor film 133 that is to be irradiated. When the light-shielding film 134 is provided, a portion of the incident beam, which has a low energy density, is shielded. As described above, providing the light-shielding film 134 makes it possible to enlarge a grain size in the semiconductor film without forming the state similar to the crystals formed in the case of performing laser crystallization with an excimer laser. It is preferable that the light-shielding film 134 be as thin as possible in order to minimize an effect of diffraction.

63 Claims, 10 Drawing Sheets

U.S. PATENT DOCUMENTS

| | | | |
|---|---|---|---|
| 5,134,426 A | 7/1992 | Kataoka et al. | |
| 5,184,236 A | 2/1993 | Miyashita et al. | |
| 5,307,184 A | 4/1994 | Nishiwaki et al. | |
| 5,705,413 A * | 1/1998 | Harkin et al. | 438/155 |
| 5,708,252 A | 1/1998 | Shinohara et al. | |
| 5,756,364 A * | 5/1998 | Tanaka et al. | 438/30 |
| 5,815,494 A | 9/1998 | Yamazaki et al. | |
| 5,854,803 A | 12/1998 | Yamazaki et al. | |
| 5,893,990 A | 4/1999 | Tanaka | |
| 5,930,609 A * | 7/1999 | Young | 438/166 |
| 5,932,118 A | 8/1999 | Yamamoto et al. | |
| 5,946,561 A * | 8/1999 | Yamazaki et al. | 438/166 |
| 5,963,823 A | 10/1999 | Yamazaki et al. | |
| 5,970,368 A | 10/1999 | Sasaki et al. | |
| 6,008,101 A | 12/1999 | Tanaka et al. | |
| 6,054,739 A | 4/2000 | Yamazaki et al. | |
| 6,087,277 A | 7/2000 | Shih et al. | |
| 6,104,535 A | 8/2000 | Tanaka | |
| 6,117,752 A | 9/2000 | Suzuki | |
| 6,133,076 A | 10/2000 | Yamazaki et al. | |
| 6,136,632 A * | 10/2000 | Higashi | 438/166 |
| 6,149,988 A | 11/2000 | Shinohara et al. | |
| 6,168,968 B1 | 1/2001 | Umemoto et al. | |
| 6,172,820 B1 | 1/2001 | Kuwahara | |
| 6,187,088 B1 | 2/2001 | Okumura | |
| 6,210,996 B1 | 4/2001 | Yamazaki et al. | |
| 6,242,292 B1 | 6/2001 | Yamazaki et al. | |
| 6,246,524 B1 | 6/2001 | Tanaka | |
| 6,249,385 B1 | 6/2001 | Yamazaki et al. | |
| 6,261,856 B1 | 7/2001 | Shinohara et al. | |
| 6,274,885 B1 | 8/2001 | Yamazaki et al. | |
| 6,284,564 B1 | 9/2001 | Balch et al. | |
| 6,300,176 B1 | 10/2001 | Zhang et al. | |
| 6,304,385 B1 | 10/2001 | Tanaka | |
| 6,341,042 B1 | 1/2002 | Matsunaka et al. | |
| 6,368,945 B1 | 4/2002 | Im | |
| 6,373,870 B1 | 4/2002 | Yamazaki et al. | |
| 6,396,560 B1 | 5/2002 | Noguchi et al. | |
| 6,429,100 B2 * | 8/2002 | Yoneda | 438/487 |
| 6,468,842 B2 | 10/2002 | Yamazaki et al. | |
| 6,482,722 B2 | 11/2002 | Kunii et al. | |
| 6,483,639 B2 | 11/2002 | Fujinoki et al. | |
| 6,495,405 B2 * | 12/2002 | Voutsas et al. | 438/166 |
| 6,524,977 B1 | 2/2003 | Yamazaki et al. | |
| 6,528,397 B1 | 3/2003 | Taketomi et al. | |
| 6,528,758 B2 | 3/2003 | Shaffer | |
| 6,548,370 B1 | 4/2003 | Kasahara et al. | |
| 6,555,449 B1 | 4/2003 | Im et al. | |
| 6,558,991 B2 * | 5/2003 | Yamazaki et al. | 438/151 |
| 6,563,077 B2 | 5/2003 | Im | |
| 6,573,163 B2 | 6/2003 | Voutsas et al. | |
| 6,573,531 B1 | 6/2003 | Im et al. | |
| 6,577,380 B1 | 6/2003 | Sposili et al. | |
| 6,613,619 B2 | 9/2003 | Yamazaki et al. | |
| 6,635,554 B1 | 10/2003 | Im et al. | |
| 6,635,555 B2 | 10/2003 | Voutsas | |
| 6,642,091 B1 | 11/2003 | Tanabe | |
| 6,660,576 B2 * | 12/2003 | Voutsas et al. | 438/166 |
| 6,664,147 B2 | 12/2003 | Voutsas | |
| 6,686,978 B2 | 2/2004 | Voutsas | |
| 6,727,125 B2 * | 4/2004 | Adachi et al. | 438/166 |
| 6,731,371 B1 | 5/2004 | Shiraishi | |
| 6,744,008 B1 | 6/2004 | Kasahara et al. | |
| 6,764,886 B2 * | 7/2004 | Yamazaki et al. | 438/164 |
| 6,777,276 B2 * | 8/2004 | Crowder et al. | 438/166 |
| 6,797,550 B2 * | 9/2004 | Kokubo et al. | 438/164 |
| 6,861,614 B1 | 3/2005 | Tanabe et al. | |
| 6,949,422 B2 * | 9/2005 | Kim | 438/166 |
| 6,984,573 B2 | 1/2006 | Yamazaki et al. | |
| 6,989,300 B1 | 1/2006 | Tanabe | |
| 7,049,184 B2 * | 5/2006 | Tanabe | 438/166 |
| 7,063,999 B2 | 6/2006 | Tanabe et al. | |
| 7,078,281 B2 | 7/2006 | Tanaka et al. | |
| 7,105,048 B2 | 9/2006 | Yamazaki et al. | |
| 7,164,152 B2 | 1/2007 | Im | |
| 2001/0001745 A1 | 5/2001 | Im et al. | |
| 2001/0019861 A1 | 9/2001 | Yamazaki et al. | |
| 2001/0019863 A1 | 9/2001 | Yang | |
| 2001/0030798 A1 | 10/2001 | Fujinoki et al. | |
| 2001/0041426 A1 | 11/2001 | Im | |
| 2001/0052513 A1 | 12/2001 | Tanabe | |
| 2002/0016075 A1 | 2/2002 | Peng et al. | |
| 2002/0025615 A1 | 2/2002 | Yamazaki et al. | |
| 2002/0045288 A1 | 4/2002 | Yamazaki et al. | |
| 2002/0102821 A1 | 8/2002 | Voutsas | |
| 2002/0102822 A1 | 8/2002 | Voutsas et al. | |
| 2002/0102824 A1 | 8/2002 | Voutsas et al. | |
| 2002/0117666 A1 | 8/2002 | Voutsas | |
| 2002/0117718 A1 | 8/2002 | Voutsas | |
| 2002/0118317 A1 | 8/2002 | Voutsas | |
| 2002/0119644 A1 | 8/2002 | Voutsas | |
| 2002/0151121 A1 | 10/2002 | Tanaka | |
| 2003/0060026 A1 | 3/2003 | Yamazaki et al. | |
| 2004/0266223 A1 | 12/2004 | Tanaka et al. | |

FOREIGN PATENT DOCUMENTS

| | | |
|---|---|---|
| JP | 63-203292 | 8/1988 |
| JP | 01-260812 | 10/1989 |
| JP | 05-082452 | 4/1993 |
| JP | 08-195357 | 7/1996 |
| JP | 09-270393 | 10/1997 |
| JP | 09-321311 | 12/1997 |
| JP | 11-212021 | 8/1999 |
| JP | 11-354463 | 12/1999 |
| JP | 2000-058478 | 2/2000 |
| JP | 2001-074950 | 3/2001 |
| JP | 2001-156017 | 6/2001 |

* cited by examiner

Fig.4A
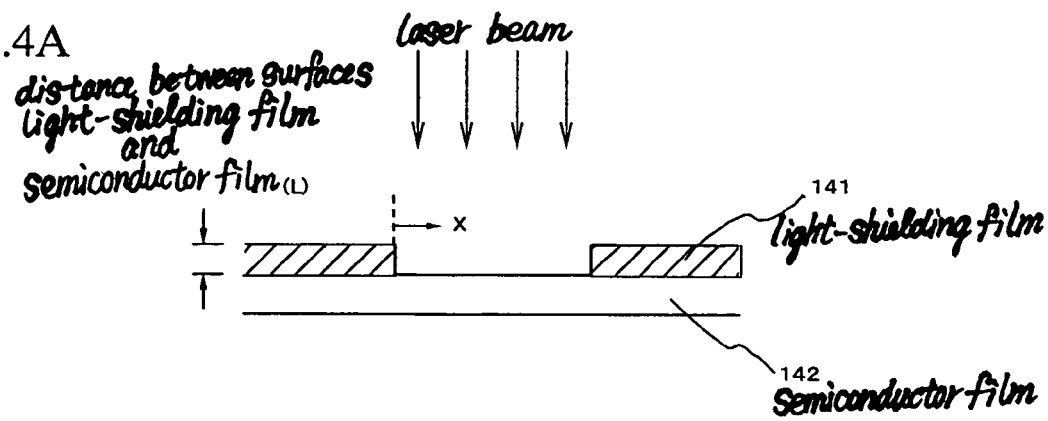
Fig.4B L = 1 μm
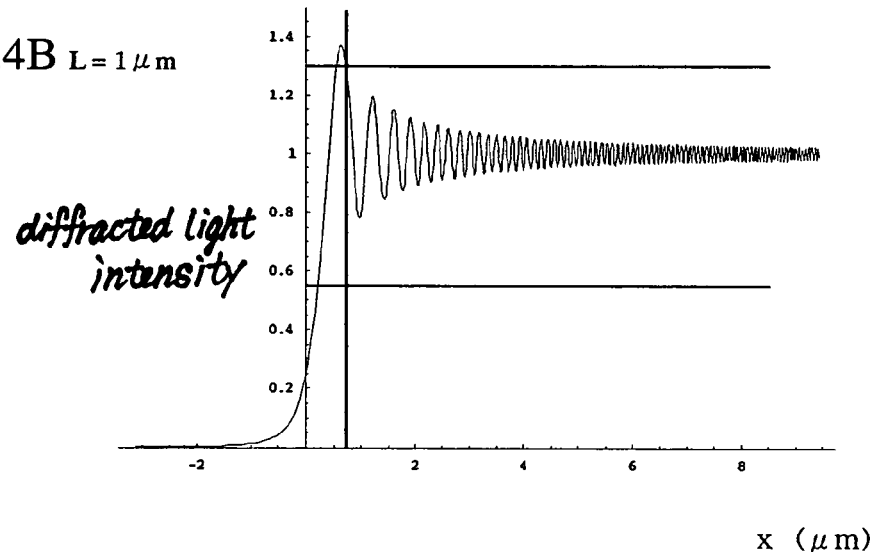
x (μm)
Fig.4C L = 10 μm
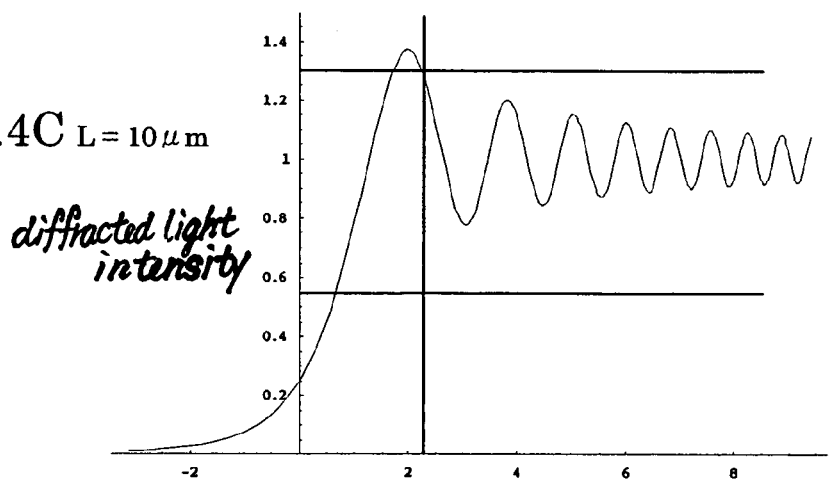
x (μm)

LASER IRRADIATION METHOD, METHOD FOR MANUFACTURING SEMICONDUCTOR DEVICE, AND LASER IRRADIATION SYSTEM

BACKGROUND OF THE INVENTION

1. Field of the Invention

The present invention relates to a laser irradiation method, a method for manufacturing a semiconductor device, which uses the laser irradiation method, and a laser irradiating system, and particularly to a technique that can be utilized in processing a thin film such as a semiconductor film.

2. Description of the Related Art

In recent years, the technique for forming a thin film transistor (hereinafter referred to as TFT) over a substrate has made great progress and the application to an active matrix type semiconductor device has been developed. Especially, a TFT with a polycrystalline semiconductor film is superior in field-effect mobility (also called mobility) to a TFT with a conventional amorphous semiconductor film, and thereby a high-speed operation is possible. Therefore, it has been tried to control a pixel by a driver circuit formed on the same substrate as the pixel, which was controlled conventionally by a driver circuit provided outside the substrate.

By the way, a substrate used for a semiconductor device is expected to be a glass substrate rather than a single-crystal silicon substrate in terms of costs. However, a glass substrate is inferior in heat resistance and easy to change in shape due to heat. Therefore, in the case of forming a polysilicon TFT over a glass substrate, laser annealing is used for crystallizing a semiconductor film in order to prevent the glass substrate from changing in shape due to heat.

There are, as characteristics of laser annealing, that processing time can be drastically shortened compared with another annealing that utilizes radiation heating or conduction heating and that a semiconductor substrate or a semiconductor film is heated selectively and locally to hardly damage the substrate thermally.

It is noted that the laser annealing described here includes the technique for recrystallizing a damaged layer or an amorphous layer formed over a semiconductor substrate or in a semiconductor film, and the technique for crystallizing an amorphous semiconductor film formed over a substrate. Moreover, the technique for planarizing or modifying a surface of a semiconductor substrate or a semiconductor film is also included.

According to how to oscillate, laser oscillators used for laser annealing are classified broadly into two types, a pulsed laser oscillator and a continuous wave (CW) laser oscillator. In recent years, it has been known that in crystallization of a semiconductor film, a grain size of a crystal formed in the semiconductor film is larger in the case of using a CW laser oscillator than using a pulsed laser oscillator. When the grain size in the semiconductor film becomes larger, the number of grain boundaries included in a channel region in a TFT formed with the semiconductor film decreases to obtain a higher mobility. As a result, the TFT can be applied to a high-performance device. Accordingly, the CW laser oscillator is beginning to attract attention.

Moreover, in performing laser annealing to semiconductor or a semiconductor film, the following method is known: a laser beam emitted from a laser oscillator is shaped into a linear or elliptical beam spot with an aspect ratio of 10 or more (since an ellipse with an aspect ratio of 10 or more looks like a line, the elliptical is called the linear in the specification) through an optical system and the beam spot is scanned to a surface to be irradiated (an irradiated surface). The method enables irradiating the laser beam effectively to a substrate to increase mass-production ability. Therefore, the method is preferably employed for industrial purposes (Japanese Patent Laid-Open Hei8-195357, for example).

In order to effectively perform laser annealing to a semiconductor film formed over a substrate, the following method is employed: a laser beam emitted from a CW laser oscillator is shaped through an optical system to have a linear beam spot at an irradiated surface, which is irradiated to the semiconductor film. Moreover, a scanning stage that has the substrate set is often moved in the direction of a minor axis of the linear beam spot to perform laser annealing to the semiconductor film. The size of the beam spot formed from the CW laser beam is extremely small, and even though green laser that outputs 10 W, which is almost the highest output among the laser oscillators that output wavelengths absorbed in the semiconductor film, is employed, the beam spot becomes an oblong with a size as small as 500 µm×20 µm. By moving the beam spot back and forth and side to side over a surface to be irradiated, laser annealing is performed to a necessary region of the surface to be irradiated.

In this case, since the heavy scanning stage moves at a high speed (between 100 mm/s and 2000 mm/s approximately), vibration is caused due to the movement of the scanning stage. When the vibration transmits to a vibration isolator where an optical system that forms a beam spot and a system are mounted, a laser irradiation track formed on the substrate, which is not linear any more, is undulating in a reflection of the vibration. When the laser irradiation track is undulated, there are formed some portions where the overlapping ratio is extremely high, and some portions where the laser beam is not irradiated at all between the adjacent laser irradiation tracks formed according to the back-and forth motion of the scanning stage. Since a TFT is formed over the substrate in an orderly arrangement, a TFT formed in the above-mentioned portions is inferior in electrical characteristics, which also causes fluctuation in electrical characteristics. It is a first object of the present invention to suppress the undulation of the irradiation tracks due to such vibration.

In addition, FIG. 1 shows an irradiation track of a beam spot 111 on a semiconductor film. In the irradiation track of the beam spot 111, states of crystals, which can be broadly classified into two types, are formed. In regions A and C, a state similar to crystals formed in the case of performing laser crystallization with pulsed excimer laser is formed. On the other hand, in region B, another state of crystals, in which grain size are larger than those in the case of the crystallization with the pulsed excimer laser, (hereinafter, this state is called a large grain size) is formed.

When the grain size in the semiconductor film becomes large, the number of grain boundaries in a channel region of a TFT formed with the semiconductor film decreases to obtain a higher mobility. On the contrary, the mobility of a TFT in the region where the state similar to the crystals formed in the case of performing laser crystallization with excimer laser is formed, is much inferior to the mobility of a TFT in the region of the large grain size. That is to say, a big difference is caused between electrical characteristics of a TFT formed in the region of the large grain size and a TFT in the region where the state similar to the crystals formed in the case of performing laser crystallization with excimer laser is formed. The difference causes fluctuation in electrical characteristics in the substrate. It is a second object of the present invention to minimize, as much as possible, the region where the state similar to the crystals formed in the case of performing laser crystallization with excimer laser is formed, which is formed in the semiconductor film.

SUMMARY OF THE INVENTION

The present invention makes it possible to remove a portion of a laser beam, which forms a state similar to crystals formed in the case of performing laser crystallization with excimer laser, and form only a region of a large grain size in a semiconductor film by providing a film including a material through which the laser beam is not transmitted (hereinafter, referred to as a light-shielding film) over the semiconductor film that is a surface to be irradiated (an irradiated surface). Moreover, the present invention provides a laser irradiation method that enables rectilinear laser irradiation, a method for manufacturing a semiconductor device, which uses the laser irradiation method, and a laser irradiation system.

FIGS. 2A and 2B are drawings explaining a summary of the present invention. A light-shielding film 122 is provided over a semiconductor film 123 that is a surface to be irradiated. When the light-shielding film 122 is provided, a portion of the incident beam 121, which has a low energy density, that is to say, a portion that forms a state similar to crystals formed in the case of performing laser crystallization with excimer laser in irradiating to the semiconductor film, is shielded compellingly. As described above, providing the light-shielding film 122 makes it possible to enlarge a grain size in the semiconductor film without forming the state similar to the crystals formed in the case of performing laser crystallization with excimer laser. It is preferable that the light-shielding film 122 is as thin as possible in order to minimize an effect of diffraction.

The vibration of the optical system due to the vibration caused by the movement of the scanning stage brings about vibration of the beam spot and undulation of the laser irradiation track. When a width of an opening of the light-shielding film in the direction perpendicular to a scanning direction of the laser beam is made smaller than a width of the beam spot in the direction perpendicular to the scanning direction, the laser irradiation track can be made rectilinear. Moreover, when the width of the light-shielding film is controlled to make the energy density of the laser beam on the semiconductor film, which goes through the opening, exceed the value at which a large grain size is formed, a polycrystalline silicon with an enlarged grain size can be formed in any region.

That is to say, the present invention provides a laser irradiation method for irradiating a beam spot to an object to be irradiated, which comprises the steps of shaping a laser beam emitted from a laser oscillator to become the beam spot, which is linear or elliptical, on a surface to be irradiated when a surface of the object to be irradiated set over a scanning stage is the surface to be irradiated and scanning the scanning stage relatively in the direction of a minor axis of the beam spot while irradiating the beam spot, and the beam spot is irradiated while positions of the object to be irradiated and the beam spot are controlled to shield a portion of the beam spot, which has a lower energy density than the center of the beam spot, with a light-shielding film provided over the object to be irradiated.

Here, the light-shielding film includes a film such as a metal film, and it is preferable that a distance between a surface of the light-shielding film and the surface of the object to be irradiated is not more than 10 µm, more preferably not more than 1 µm. In addition, it is preferable to use a continuous wave solid laser, and it is possible to use a kind selected from the group consisting of a YAG laser, a $YVO_4$ laser, a YLF laser, a $YalO_3$ laser, a $Y_2O_3$ laser, an alexandrite laser, a Ti:Sapphire laser, an Ar laser, a Kr laser, and a $CO_2$ laser. It is noted that a pulse oscillation laser may be used.

The present invention provides a method for manufacturing a semiconductor device, comprising the steps of forming a non single-crystal semiconductor film over a substrate, forming a light-shielding film that has an opening over the non single-crystal semiconductor film preferably after forming an anti-contamination film on the non-single crystal semiconductor film, shaping a laser beam emitted from a laser oscillator to become a linear or elliptical beam spot on a surface to be irradiated when a surface of the non-single crystal semiconductor film is the surface to be irradiated, and performing laser annealing to the non-single crystal semiconductor film while an irradiated position (a position to be irradiated) of the beam spot is moved, wherein the laser annealing to the non-single crystal semiconductor film is performed to shield a portion of the beam spot, which has a lower energy density than the center of the beam spot, with the light-shielding film.

Here, the light-shielding film includes a film such as a metal film and the anti-contamination film includes a film such as a silicon oxide film, and it is preferable that a distance between a surface of the light-shielding film and the surface of the non single-crystal semiconductor film is not more than 10 µm, more preferably not more than 1 µm. In addition, it is preferable to use a continuous wave solid laser, and it is possible to use a kind selected from the group consisting of a YAG laser, a $YVO_4$ laser, a YLF laser, a $YalO_3$ laser, a $Y_2O_3$ laser, an alexandrite laser, a Ti:Sapphire laser, an Ar laser, a Kr laser, and a $CO_2$ laser. It is noted that a pulse oscillation laser may be used.

Instead of the metal film, a film for promoting reflection may be used as the light-shielding film. The film for promoting reflection is a film that has properties such as a material and a thickness that are optimized in accordance with a wavelength of the laser beam so as to reinforce the intensity of reflected light. For example, it is possible to use, as the light-shielding film, a laminate formed of an amorphous silicon film with a thickness of 54 nm, a silicon oxynitride film with a thickness of 88 nm, and a silicon nitride film with a thickness of 64.3 nm. It is noted that the film for promoting reflection may have a single layer structure or a laminated structure. In addition, it is preferable to employ an insulating film as the film for promoting reflection. The insulating film is unlikely to be spattered compared to the metal film, and moreover, it is not necessary to provide the anti-contamination film since the semiconductor film is not contaminated by the metal.

The present invention provides a laser irradiation system comprising a laser oscillator, an optical system shaping a laser beam emitted from the laser oscillator to become a linear or elliptical beam spot on a surface to be irradiated, and a means for shielding a portion of the beam spot with a light-shielding film formed over the surface to be irradiated and for adjusting an irradiated position (a position to be irradiated) to irradiate the other portion of the beam spot to the surface to be irradiated.

It is preferable to use a continuous wave solid laser oscillator, and it is possible to use a kind selected from the group consisting of a YAG laser, a $YVO_4$ laser, a YLF laser, a $YalO_3$ laser, a $Y_2O_3$ laser, an alexandrite laser, a Ti:Sapphire laser, an Ar laser, a Kr laser, and a $CO_2$ laser. It is noted that a pulse oscillation laser may be used.

With the present invention above, laser annealing can be performed to form a large grain size in any region of a semiconductor film effectively.

BRIEF DESCRIPTION OF THE DRAWINGS

In the accompanying drawings:

FIGS. 4A to 4C are drawings showing light intensity of an diffraction image with a light-shielding film;

DETAILED DESCRIPTION OF THE PREFERRED EMBODIMENTS

Embodiment Mode 1

Hereinafter, a structure of a laser irradiation system according to the present invention will be explained with reference to FIG. 3.

The laser irradiation apparatus according to the present invention has a laser oscillator 131 that emits a laser beam. Although FIG. 3 shows an example in which only one laser oscillator 131 is provided, there is no limitation of the number of laser oscillators included in a laser irradiation system according to the present invention. A plurality of beam spots of laser beams respectively output from laser oscillators may be overlapped each other to form one beam spot.

A laser oscillator can be selected appropriately according to a purpose of processing. A known laser oscillator can be used in the present invention. As the laser oscillator, a continuous wave gas laser or a continuous wave solid laser can be used. As the gas laser, there are an Ar laser, a Kr laser, and a $CO_2$ laser, for example. As the solid laser, there are a YAG laser, a $YVO_4$ laser, a YLF laser, a $YAlO_3$ laser, a $Y_2O_3$ laser, an alexandrite laser, and a Ti:Sapphire laser, for example. It is possible to obtain higher harmonics to the fundamental wave through a non-linear optical element. In addition, an element such as Nd, Cr, Yb, or Er is used as a dopant to the laser medium.

Moreover, it is also possible to a green laser beam converted from an infrared laser beam emitted from a solid laser through a non-linear optical element and to use an ultraviolet laser beam converted through another non-linear optical element.

Figure 5A:
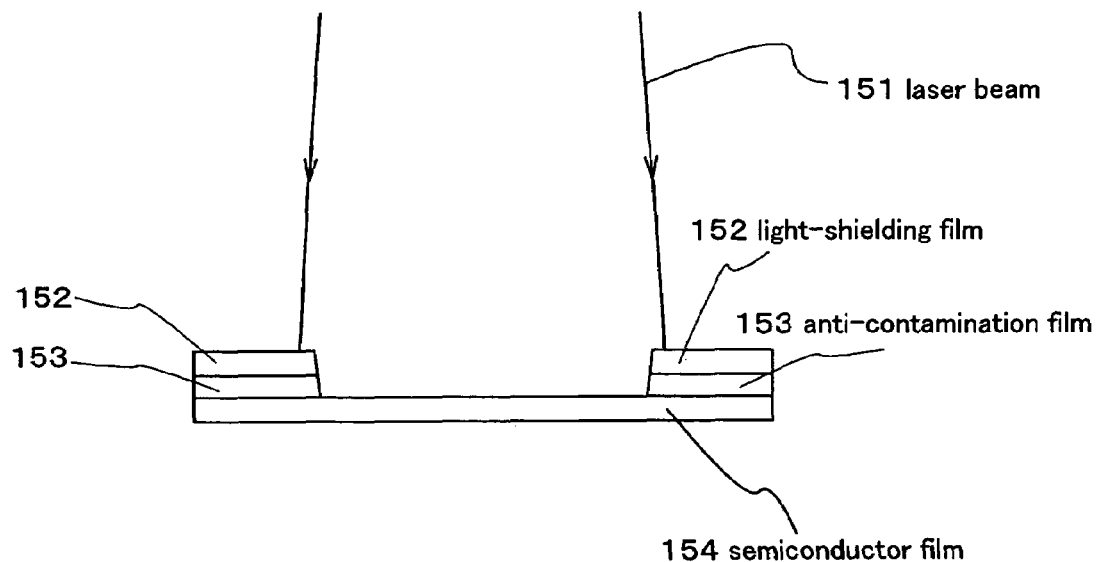
FIGS. 5A and 5B are drawings showing an example using an anti-contamination film.
Figure 5B:
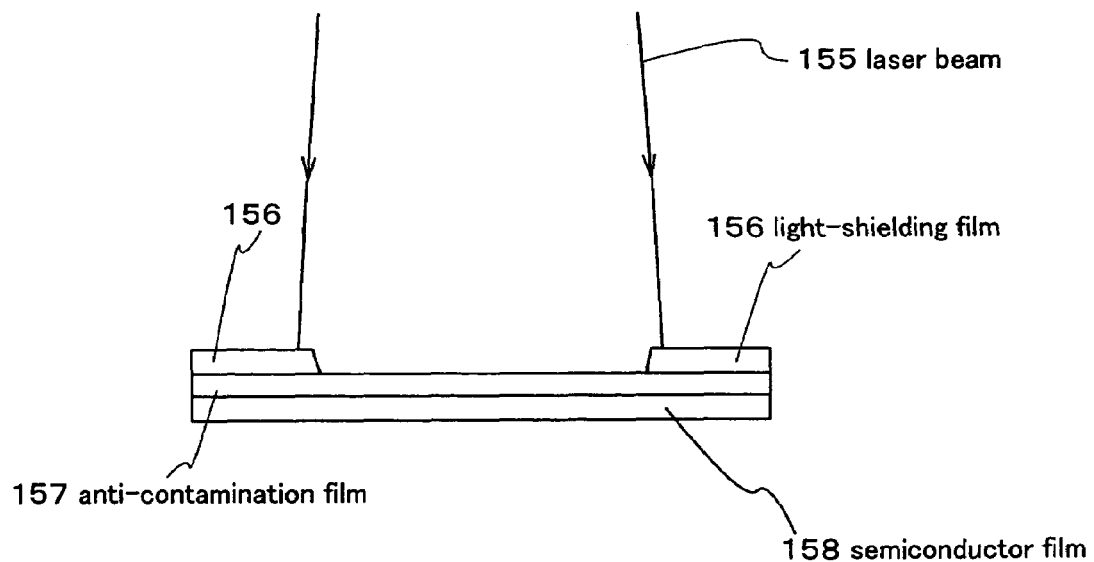

Next, an explanation will be given on a substrate 133 in which a semiconductor film to be subjected to laser annealing with the laser irradiation system is formed. After forming the semiconductor film over the substrate, a film including a material through which the laser beam is not transmitted (a light-shielding film 134) is formed in a region of the substrate, in which no TFT is formed. For example, metal such as aluminum that reflects a laser beam may be used as the light-shielding film. In the case of using a film including the metal, an oxidized film may be formed on the metal film in order to prevent a surface of the metal film from being oxidized due to laser irradiation. In addition, when the metal film is used as the light-shielding film and there is the possibility of metal contamination of the semiconductor film, a film for preventing invasion of the metal (hereinafter, referred to as anti-contamination film in the specification) may be provided between the semiconductor film and the light-shielding film. As the anti-contamination film, an oxidized film such as $SiO_2$ may be used. FIGS. 5A and 5B each show an example in which the anti-contamination film is formed between the semiconductor film and the light-shielding film. The laser beam may be irradiated while the anti-contamination film is formed on the semiconductor film.

In the case where the whole of a linear beam spot formed through an optical system 132 is incident into the semiconductor film, it is preferable that the light-shielding film 134 has a shape to cut off a portion of the laser beam, which forms a state similar to crystals formed in the case of performing laser crystallization with excimer laser. When a width of the laser beam irradiated the semiconductor film is narrowed by amplitude of undulation of a laser irradiation track formed on the semiconductor film, an effect of vibration can be removed.

Figure 9:
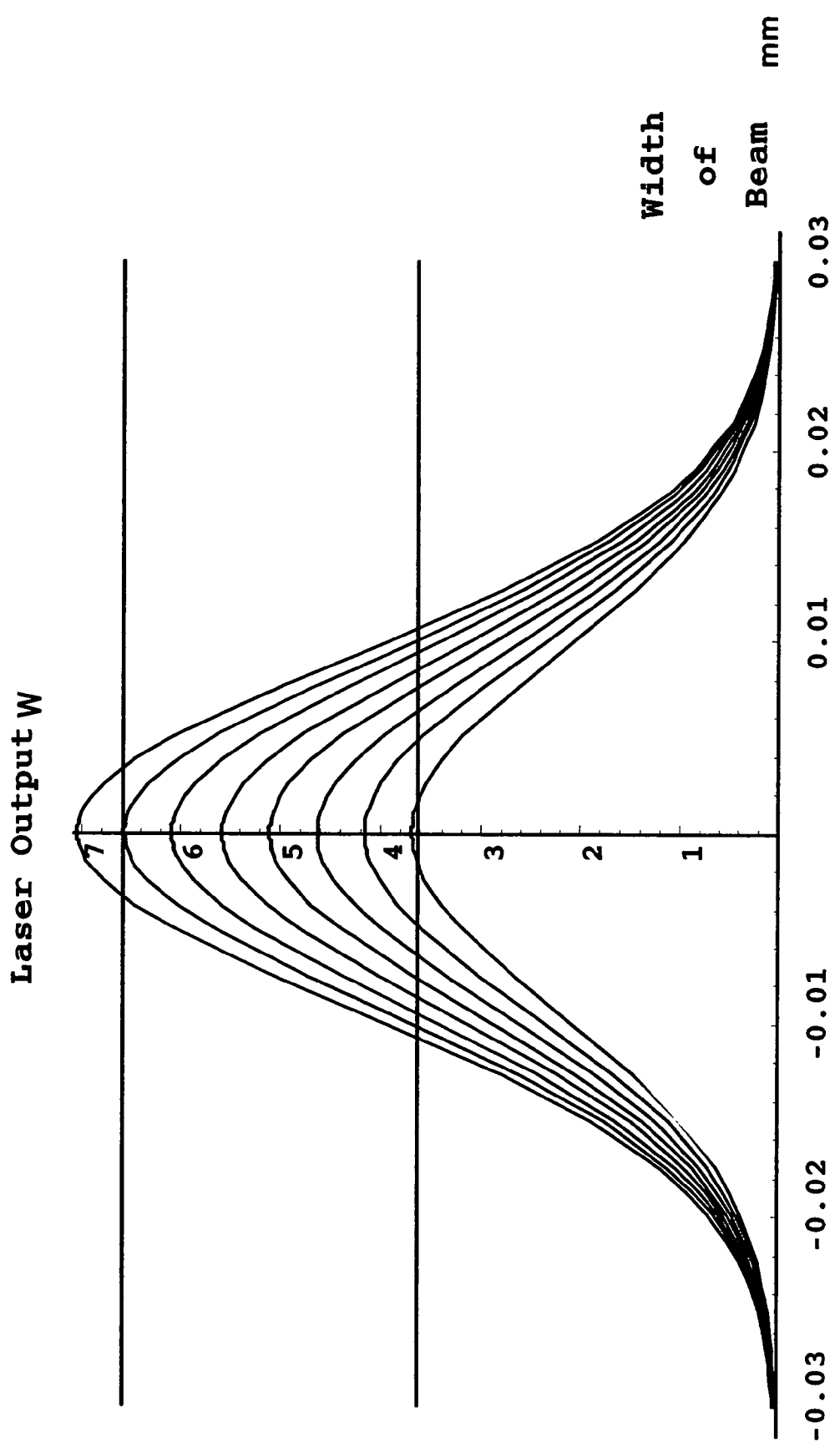
FIG. 9 is a drawing for explaining a relation between a laser output and a width of a large grain size.

Next, an effect of diffraction of the laser beam will be considered. FIG. 9 shows results of the experiment in which energy of a laser beam varies while a width of the beam is kept constant. When a peak of the energy of the laser beam is too low, no crystals can be formed, and a bad result such as a spattered film is caused in the case of being too high. In other words, it is necessary to perform crystallization with a laser beam with the energy that makes crystallization possible and causes no spattered film. The laser oscillator used this time outputs energy from 3.6 W to 6.6 W, and the average is 5.1 W. Accordingly, when the average intensity of the laser beam is assumed to be 1, the semiconductor film is crystallized to have a large grain size with a laser beam that has intensity from 0.7 to 1.3. Therefore, when intensity of diffracted light takes a value from 0.7 to 1.3 compared with the average intensity, a semiconductor film with uniform crystallinity can be obtained.

FIGS. 4B and 4C show results of computing light intensity of diffracted light on a semiconductor film in the case of assuming the distance between surfaces of a light-shielding film and a semiconductor film to be 1 µm and 10 µm respectively. When the distance is assumed to be 1 µm, it is possible to narrow a region in which crystallinity is not uniform within 1 µm from an edge of the light-shielding film. In addition, when the distance is assumed to be 10 µm, it is possible to narrow a region in which crystallinity is not uniform within 3 µm from the edge of the light-shielding film.

A laser beam emitted from the laser oscillator 131 is incident into an optical system 132 for shaping a linear beam spot on the substrate 133. It is noted that the shape of a laser beam emitted from a laser oscillator depends on the kind of the laser oscillator. In the case of a YAG laser, for example, a laser oscillator with a cylindrical rod emits a circular laser beam and a laser oscillator with a slab rod emits a rectangular laser beam. Since a rectangular laser beam emitted from the slab-type laser has a difference between divergence angles in the direction of a longer side and in the direction of a shorter side, the shape of the laser beam largely changes in accordance with a distance from an exit of the laser oscillator. When the shape of the laser beam is changed through an optical system, a linear or elliptical laser beam with a desired size can be obtained.

In addition, in the case of using a plurality of laser oscillators, laser beams output from respective laser oscillators may be overlapped to form one beam spot.

The beam spot shaped through the optical system 132 is irradiated to the substrate over which the semiconductor film and the light-shielding film 134 are formed. When laser irradiation is performed as describe above, it is possible to perform laser annealing in order to enlarge a grain size in any region. The light shielding film 134 may be removed by etching after laser annealing.

Figure 6:
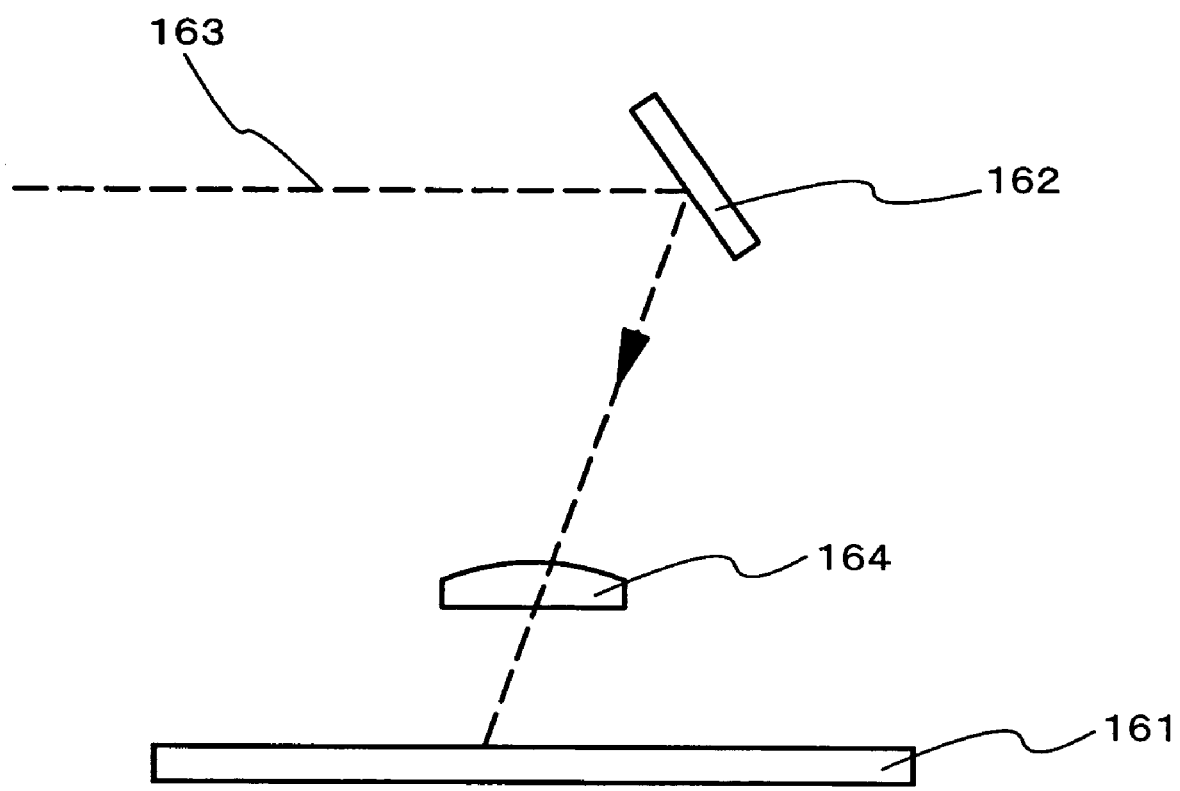
FIG. 6 is a drawing showing an example of an optical system included in a laser irradiation system.

An example of an optical system for forming elliptical beam spot will be explained with reference to FIG. 6. An optical axis is set with a mirror 162 to make a semiconductor film 161 have an incident angle 20°. A laser beam 163 is made incident into a spherical lens 164 with a focal length of 20 mm, which is arranged in the position of 20 mm from the semiconductor film 161. With the arrangement above, an elliptical beam spot with a size of 500 μm×20 μm can be formed on the semiconductor film. It is noted that BK7 is used as a material of the spherical lens 164 in accordance with a wavelength of the laser beam to be used.

As described above, laser annealing performed with the use of the laser irradiation system according to the present invention can provide a TFT with reduced fluctuation in electrical characteristics and with a high mobility.

Hereinafter, a method for manufacturing a semiconductor device with the use of the laser irradiation system according to the present invention will be explained. First, a glass substrate (corning 1737) with a size of 127 mm×127 mm×0.7 mm is prepared. The substrate has enough resistance against a temperature up to 600° C. Next, a silicon oxide film is formed on the substrate to have a thickness of 200 nm as a base film. Then, an amorphous silicon film is formed thereon to have a thickness of 55 nm. The silicon oxide film and the amorphous silicon film are both formed with sputtering, or alternatively, may be formed with plasma CVD.

The substrate on which the silicon oxide film and the amorphous silicon film fare formed is placed in a nitrogen atmosphere at a temperature of 450° C., which is a process for reducing the concentration of hydrogen included in the amorphous silicon film. When the amorphous silicon film has an extremely large amount of hydrogen, it is not possible to resist energy of a laser beam, and thereby the process is necessary. It is appropriate that the concentration of hydrogen in the amorphous silicon film is not more than $10^{20}/cm^3$. Here, "$10^{20}/cm^3$" means that $10^{20}$ hydrogen atoms exist per 1 $cm^3$.

In the embodiment mode, an LD excitation $YVO_4$ laser manufactured by Coherent, Inc. is used as the laser oscillator. The $YVO_4$ laser emits a continuous wave laser beam with a wavelength of 532 nm, and outputs up to 10 W.

Figure 1:
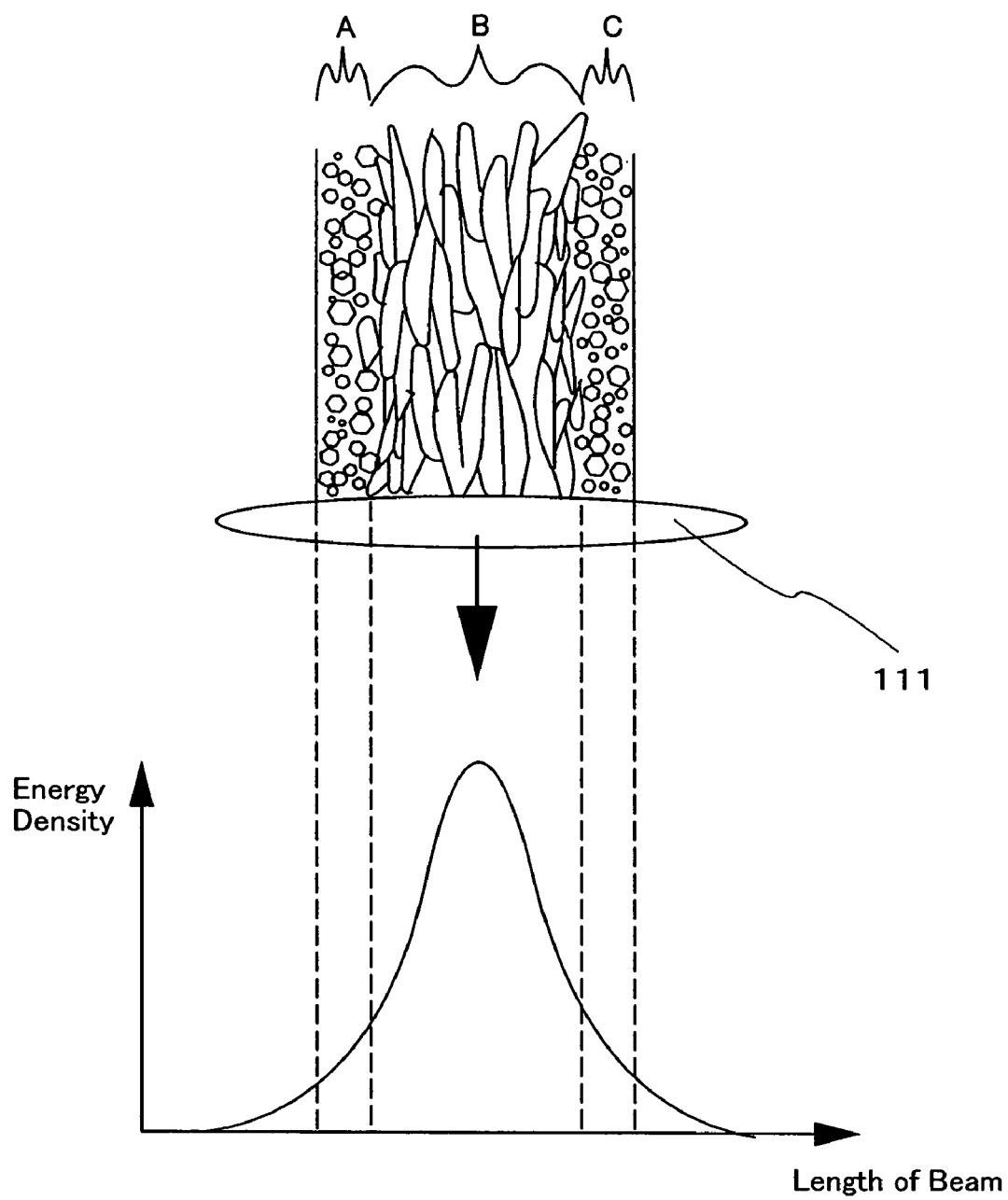
FIG. 1 is a drawing showing a state of crystals with laser annealing performed.
Figure 2A:
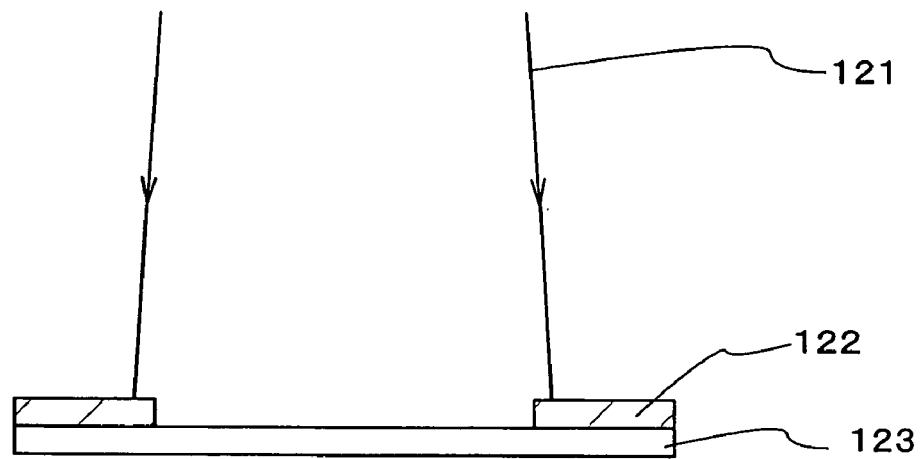
FIGS. 2A and 2B are drawings explaining means of the present invention.
Figure 2B:
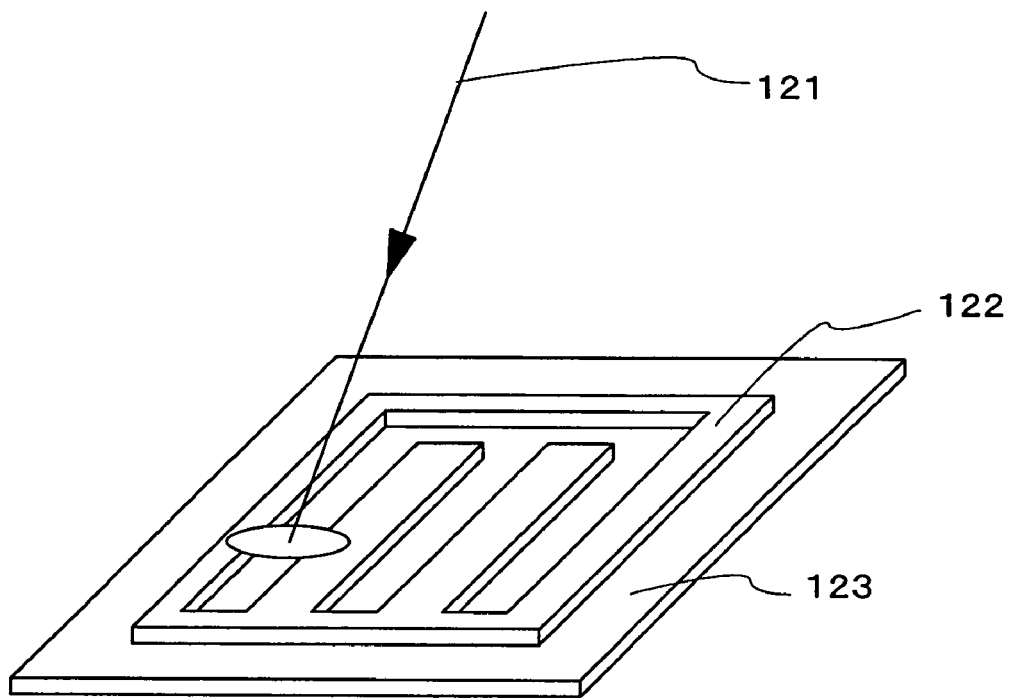
Figure 3:
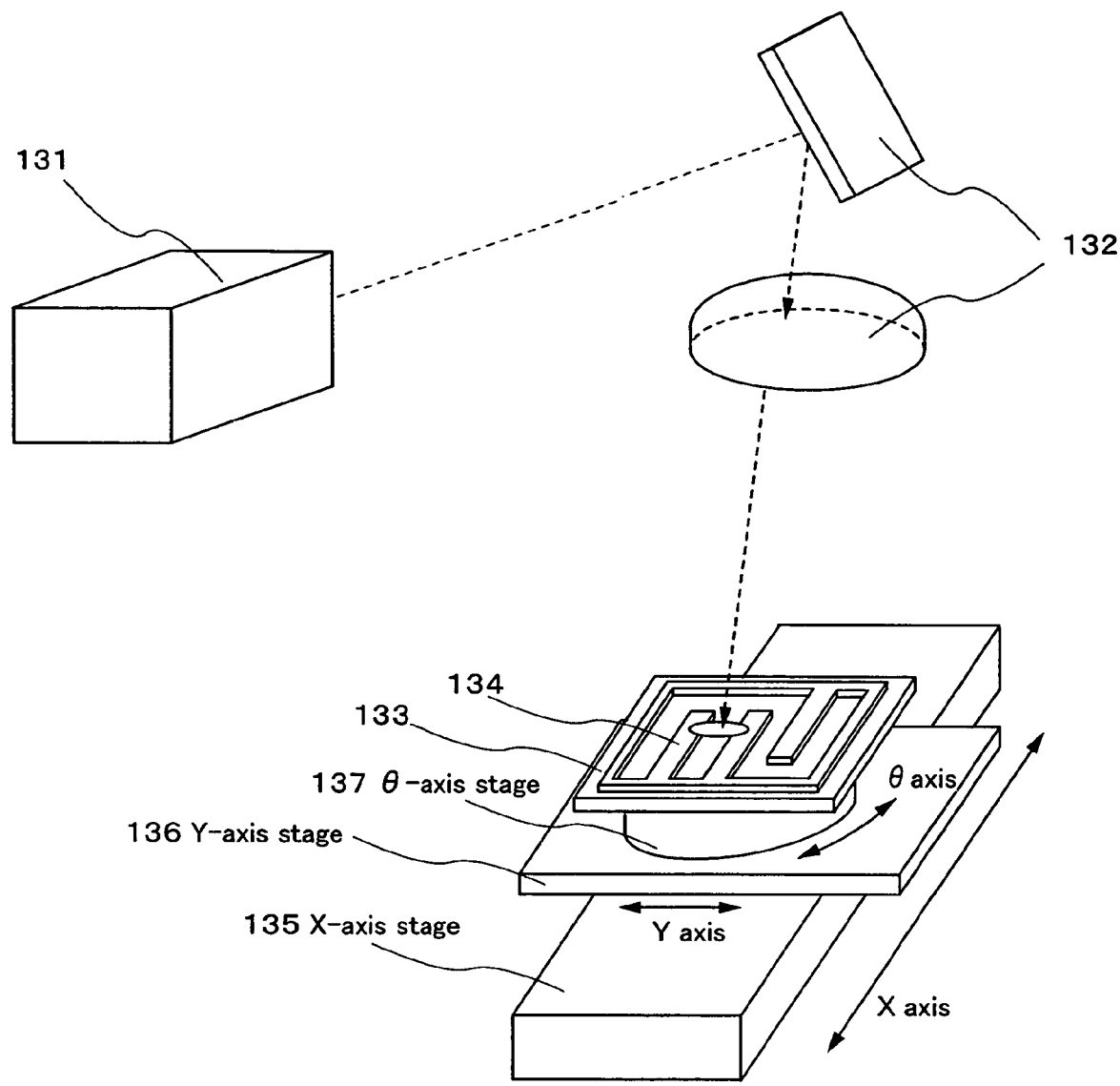
FIG. 3 is a drawing showing an example of a laser irradiation system according to the present invention.

The laser beam is irradiated, for example, while scanning the stage that has the substrate 133 put thereon, shown in FIG. 3, in the direction of a minor axis of a linear or elliptical beam spot. An energy density of the beam spot on the surface to be irradiated and the scanning speed may be determined appropriately.

Thus, the laser annealing process is completed. When the process above is repeated, a lot of substrates can be processed. With the use of the substrate above, an active matrix liquid crystal display can be manufactured according to a known method.

In the example above, the amorphous silicon film is used as a non-single crystal semiconductor film. However, it is obvious that the present invention can be applied to another non-single crystal semiconductor. For example, a compound semiconductor film that has an amorphous structure such as an amorphous silicon-germanium film can be used as the non-single crystal semiconductor film. Alternatively, a polycrystalline silicon film can be used as the non-single crystal semiconductor film.

Embodiment Mode 2

Figure 7:
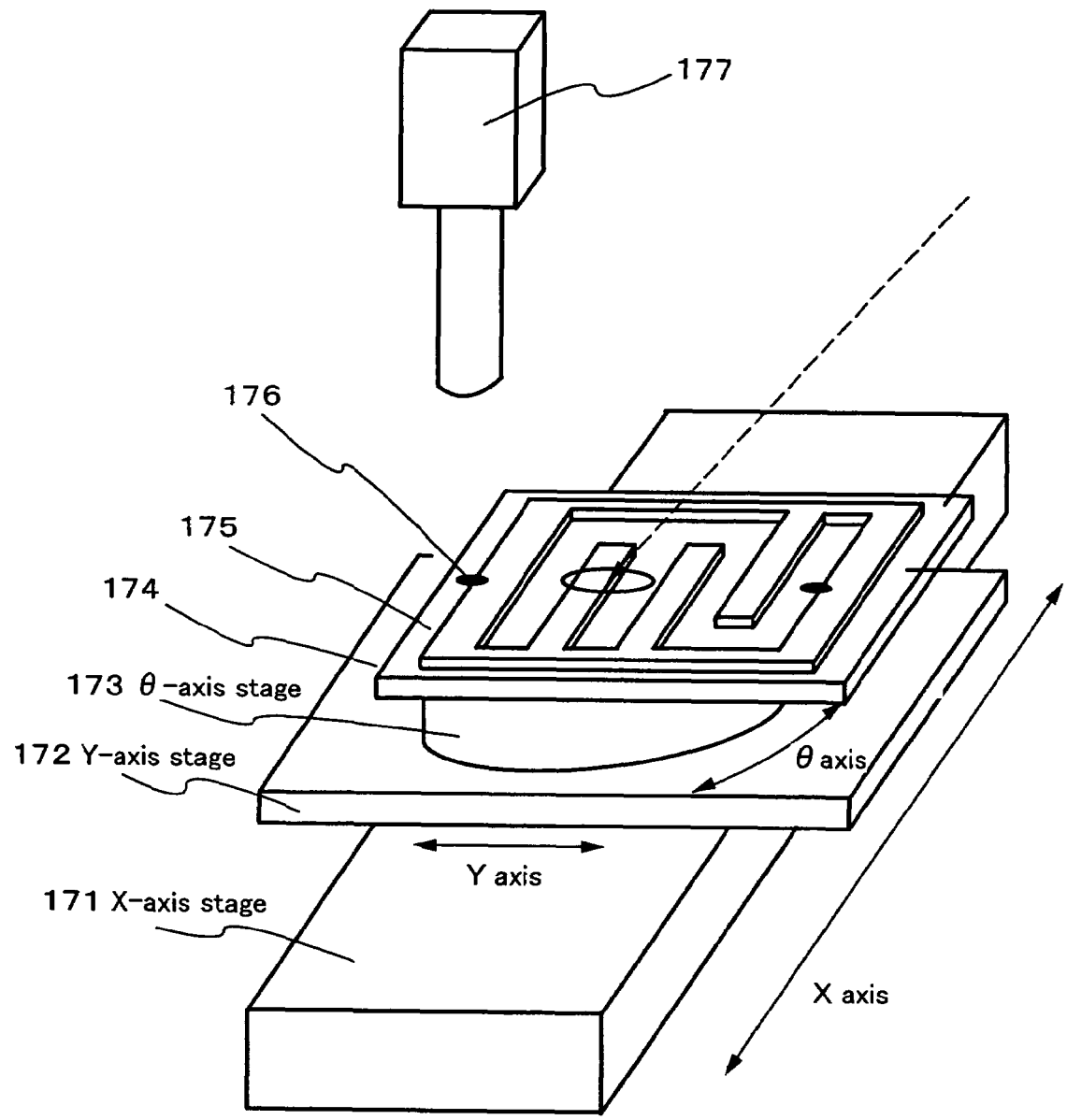
FIG. 7 is a drawing showing an example of a laser irradiation system according to the present invention.

With reference to FIG. 7, an explanation will be given on a method for shielding a portion of a beam spot with a light-shielding film formed on a surface to be irradiated and adjusting an irradiated position to irradiate the other portion of the beam spot to the surface to be irradiated.

Before setting a substrate 174 over which a semiconductor film is formed on a scanning stage, a marker 176 is formed by etching at each of both edges of a light shielding film 175 formed on the semiconductor film. It is effective to form the marker 176 at the same time as patterning of the light-shielding film 175. Thus, the positional relation between the marker 176 and the light-shielding film 175 is determined.

After setting the substrate where the marker 176 is formed on the scanning stage, an image of the marker 176 is imported in, for example, a computer with a CCD camera 177, and thus a coordinate of the position of the marker 176 is determined. The markers are formed in the two places for determining the scanning direction of the scanning stage. The marker 176 may be formed on the substrate or the semiconductor film directly as long as the CCD camera 177 can recognize an image of the marker 176.

It becomes possible to irradiate a laser beam to any region when any position of the substrate is recognized with the relative coordinates from the marker 176. Accordingly, laser annealing can be performed to the semiconductor film in accordance with the patterned shape of the light-shielding film 175.

Embodiment 1

Figure 8:
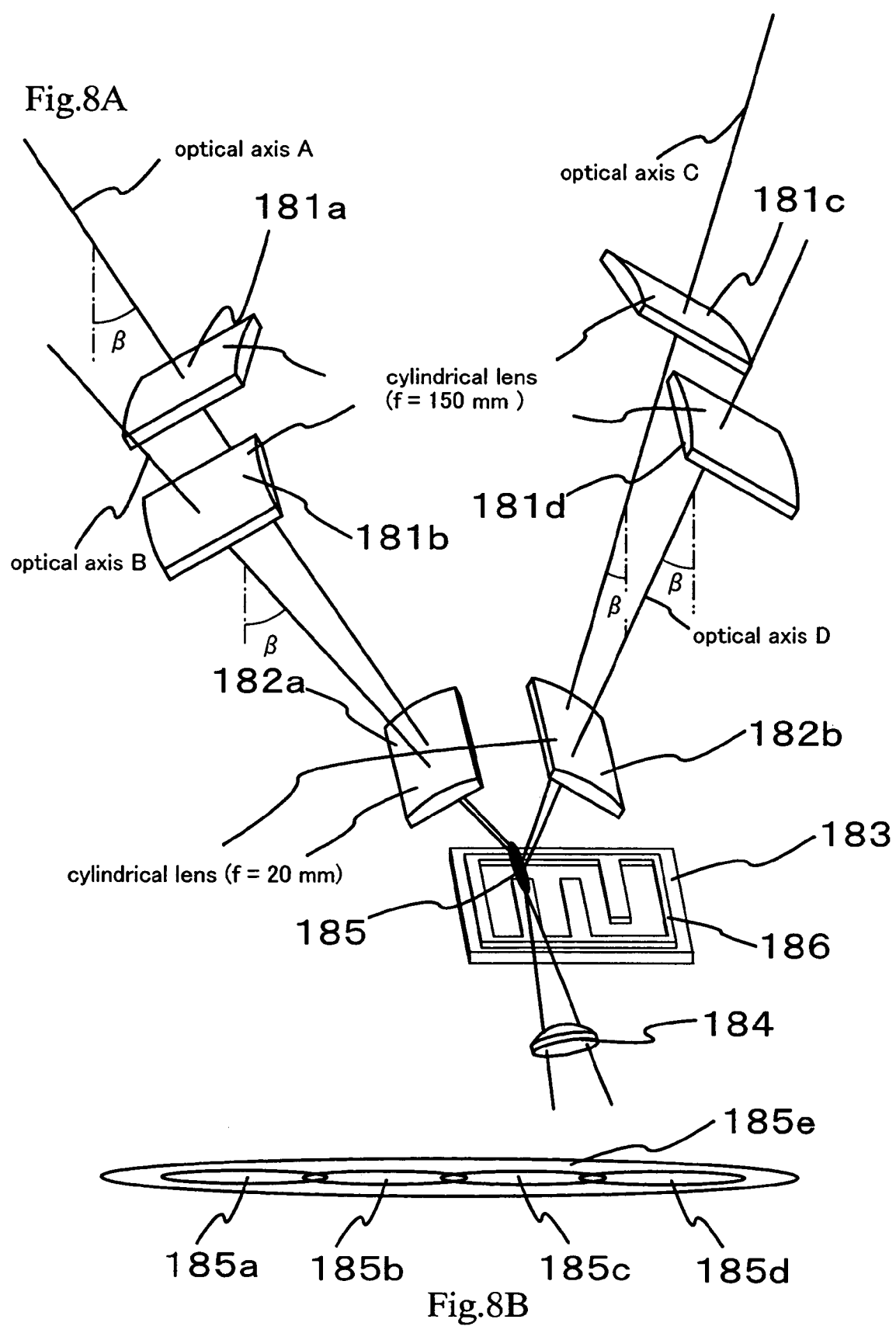
FIGS. 8A and 8B are drawings showing an example of a laser irradiation method according to the present invention.

In the present embodiment mode, an example will be described with reference to FIGS. 8A and 8B, in which several long beams obtained by processing a second harmonic are combined to form a longer beam and a fundamental wave is used to aid energy.

First, four laser oscillators (not shown in FIGS. 8A and 8B) that output 10 W with LD excitation (Nd:$YVO_4$ laser, second harmonic: 532 nm) respectively are prepared. Each of the laser oscillators uses an oscillation mode of $TEM_{00}$ and has a LBO crystal incorporated in a resonator to perform conversion into second harmonic. The respective laser beams have a beam diameter of 2.25 mm and a divergence angle on the order of 0.3 mrad. Several reflecting mirrors are used in order to convert traveling directions of the laser beams respectively to have an angle β to the vertical direction, and the laser beams with the converted traveling directions are made to go to an irradiated surface from four directions respectively in order to be combined into nearly one at the irradiated surface. The four directions are corresponded to optical axes A, B, C, and D respectively. The optical axes A and B (also the optical axes C and D) are positioned with plane symmetry to plane A that is vertical to the irradiated surface 403, and an angle made by the optical axes A and B (also an angle made by the optical axes C and D) is set at 20°. In addition, the optical axes A and C (also the optical axes B and D) are positioned with plane symmetry to plane B that is vertical to the plane A and the irradiated surface 403, and an angle made by plane C including the optical axes A and B and plane D including the optical axes C and D) is set at 50°.

Then, planoconvex cylindrical lenses 181*a*, 181*b*, 181*c*, and 181*d* that have a focal length of 150 mm are arranged in order that the optical axes A to D are made to go with an angle of 0°. On this occasion, condensing directions of the planoconvex cylindrical lenses are directions included in the plane C or plane D. A distance between the irradiated surface and each of the planoconvex cylindrical lenses 181a to 181d is adjusted between 110 to 120 mm measured along the optical axis.

Further, planoconvex cylindrical lenses 182a and 182b that have a focal length of 20 mm are arranged in order that generating lines thereof are included in the planes C and D respectively. The generating line described here is defined as a generating line located at a curved portion of the cylindrical lens, which is most apart from a plane portion of the cylindrical lens. The plane portion of the planoconvex cylindrical lens 182a and the plane C are orthogonalized each other while the plane portion of the planoconvex cylindrical lens 182b and the plane D are orthogonalized to each other. A distance between the irradiated surface and each of the planoconvex cylindrical lenses 182a and 182b is adjusted on the order of 18 mm measured along the optical axis.

With the arrangement described above, four long beams with a size of a major axis on the order of 400 µm and a minor axis on the order of 20 µm are formed at the irradiated surface. In this case, the four long beams are combined into one perfectly at the irradiated surface without forming a longer beam. However, when the positions of the respective lenses are fine adjusted, the arrangement of the four long beams is converted as shown in FIG. 8B. In other words, the major axes of the four long beams 185a to 185d are arranged in alignment and shifted each other in the direction of the major axes to form a longer beam. In this way, a long crystal grain region with a width of 1.5 mm can be obtained.

Then, CW-YAG laser (fundamental wave) that outputs 10 W with LD excitation is used to form an oblong beam 185e with a size of 1 mm×5 mm at the irradiated surface with an optical system 184. On this occasion, the oblong beam 1855e is formed to cover the four long beams. As the optical system 184, the planoconvex lens 164 shown in FIG. 6, for example, may be used and the laser beam may be made to go into the planoconvex lens obliquely at an angle thereto to form the oblong beam 185e. Alternatively, two orthogonal cylindrical lenses may be used to convert a round beam into the oblong beam. What is important here is that the fundamental wave must not be returned to the laser oscillator at all. Since the fundamental wave is reflected somewhat at a surface of a semiconductor film, only what is forbidden is that laser beam is made to go to the irradiated surface 403 vertically thereto.

Thus formed longer beam of the four long beams and the oblong beam 185e may be used to perform laser irradiation to a semiconductor film 183 with a light-shielding film 186 formed thereon, for example, with the X-axis stage 135 and the Y-axis stage 136 shown in Embodiment Mode 1. The semiconductor film may be manufactured, for example, in accordance with the method described in Embodiment Mode 1. There are advantages due to the present embodiment mode that the longer beam makes processing time shorter and the long beams with Gaussian-like energy distribution are overlapped with each other contiguously to uniform energy distribution in the direction of the major axis, which is preferable since it is possible to suppress the irregularity in temperature relatively.

Although the second harmonic is used in the present embodiment mode, other higher harmonics can be used in addition to the second harmonic. For example, the third harmonic has an advantage of a higher absorption coefficient with respect to a semiconductor film than the second harmonic.

Embodiment 2

In the present embodiment, an explanation will be given on an example where laser annealing is performed to a large-sized glass substrate according to the present invention with reference to FIG. 10.

First, a large-sized glass substrate 706 is prepared. An amorphous semiconductor film 705 is formed over the glass substrate 706 with a known method (such as sputtering, LPCVD, or plasma CVD), and then laser annealing is performed to the semiconductor film that is a surface to be irradiated. Alternatively, before laser annealing, a metal element may be added in the semiconductor film and heat treatment may be performed to crystallize the semiconductor film.

As a laser oscillator 701, a CW YAG laser or YVO$_4$ laser that outputs second harmonic is used. As shown in FIG. 10, ten laser oscillators of the same kind are used to perform laser annealing the semiconductor film 705. Since all of laser irradiation systems used the same laser oscillator and the same optical system in FIG. 10, a reference number is not given to the all, and one laser irradiation system is taken for the explanation.

Figure 10:
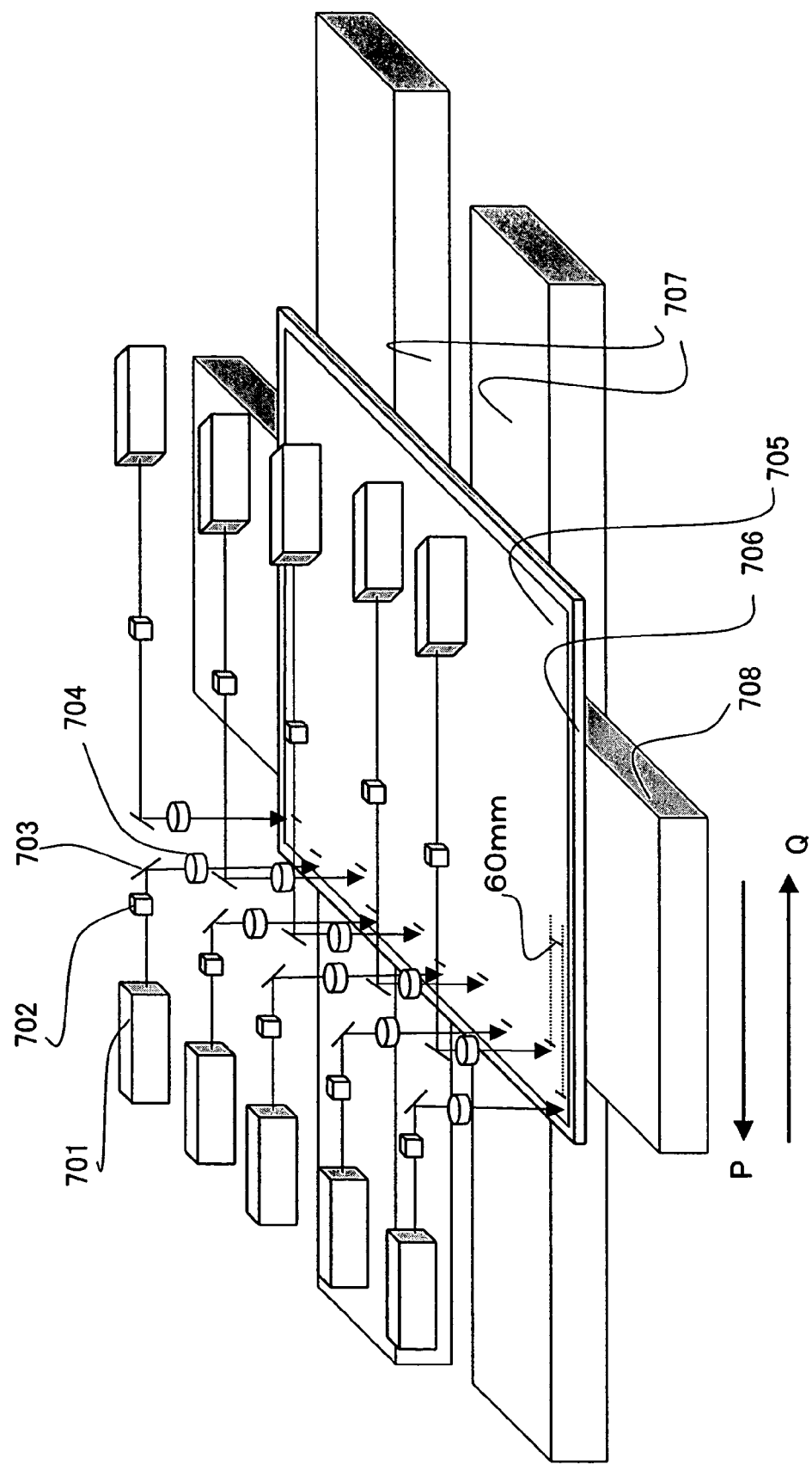
FIG. 10 is a drawing explaining an example of performing laser annealing to a large-sized substrate.

Moreover, the reason why a position where a laser beam starts to be irradiated is back and forth displaced one by one, as shown in FIG. 10 will be explained as follows. The distance between the center of a rectangular laser beam and the center of the next rectangular laser beam is as short as 60 mm on the surface to be irradiated, and it is a bit difficult to arrange a condenser lens 704 with the distance kept. Even though the arrangement of the condenser lens 704 is possible, it is predicted that such a narrow space is not enough to adjust the optical system. Therefore, it is effective to displace the irradiated position of the laser beam back and forth one by one as shown in FIG. 10. With the arrangement, the adjacent optical systems never have any contact each other, and it becomes easy to arrange and adjust the optical systems. However, since the position where the laser beam starts to be irradiated is displaced back and forth, it is necessary to extend a scanning distance of the substrate 706 slightly in order to crystallize a whole area of the amorphous semiconductor film 705.

The laser beam emitted from the laser oscillator 701 is shaped into a rectangular laser beam with an uniform energy distribution through diffractive optics 702, the laser beam is reflected by a mirror 703 and condensed with the condenser lens 704 to be incident vertically to the amorphous semiconductor film 705. In the same way, also in the other laser irradiation systems irradiate, laser beams with an uniform energy distribution are formed to be incident vertically to the amorphous semiconductor film 705.

As stages for moving the substrate 706, an X-axis stage 707 and a Y-axis stage 708 are used. Since the substrate 706 has a large size, the X-axis stage 707 has two operating axes in order to move the substrate more stably. After scanning the amorphous semiconductor film 705 in a straight line in a P direction with the X-axis stage 707, the Y-axis stage 708 is slid by a length in the direction of a width of a large grain size region (a region with a large grain size), and then the X-axis stage 707 is again scanned in a Q direction, to perform laser irradiation. When the series of operations are repeated, it is possible to make the whole area of the amorphous semiconductor film 705 a large grain size region.

Although the X-axis stage 707 and the Y-axis stage 708 are as moving stages for moving the substrate 706 in the present embodiment, a linear motor system may be employed as the drive system. Since a linear motor stage is driven by electromagnet unlike the stage driven by a ball screw, friction is not caused. Therefore, the use of a material such as grease is not necessary to cause no pollution by vaporized grease, and the linear motor stage is appropriate for using in the clean room.

Although ten systems of laser irradiation systems are used to perform laser annealing in the present embodiment, even a half of ten, that is, five laser irradiation systems, or twice as many as ten, that is, twenty laser irradiation systems, can be also used to perform laser annealing according to the present invention. Thus, the amorphous semiconductor film formed over the large-sized substrate can be crystallized to have a large grain size. When the present invention is applied to mass production of a low-temperature polysilicon TFT, it is possible to produce a TFT with high operating characteristics and reduced fluctuation in characteristics effectively.

Providing that a light-shielding film according to the present invention is used, it becomes possible to perform laser annealing to enlarge a grain size in a semiconductor film without forming a region where a state similar to crystals formed in the case of performing laser crystallization with excimer laser is formed. In addition, a light-shielding film can eliminate undulation of a laser irradiation track caused by vibration due to moving of a scanning stage. The present invention can enhance uniformity in crystallinity of the semiconductor film. When the present invention is applied to mass production of a low-temperature polysilicon TFT, it is possible to manufacture effectively a TFT with high operating characteristics and reduced fluctuation in the characteristics.

What is claimed is:

1. A method for manufacturing a semiconductor device, comprising:
    forming a non-single crystal semiconductor film over a substrate;
    providing a light-shielding film with an opening over the non-single crystal semiconductor film;
    shaping a laser beam emitted from a laser oscillator to become a beam spot on a surface to be irradiated; and
    performing laser annealing to the non-single crystal semiconductor film through the opening of the light-shielding film while relatively moving the substrate in a direction of a minor axis of the beam spot,
    wherein the beam spot has one of a linear shape and an elliptical shape,
    wherein a surface of the non-single crystal semiconductor film is the surface to be irradiated,
    wherein a portion of the beam spot is shielded with the light-shielding film while the laser annealing to the non-single crystal semiconductor film is performed, and
    wherein the portion of the beam spot has a lower energy density than the center of the beam spot.

2. A method for manufacturing a semiconductor device according to claim 1, wherein a distance between a surface of the light-shielding film and the surface of the semiconductor film is not more than 10 μm.

3. A method for manufacturing a semiconductor device according to claim 1, wherein a distance between a surface of the light-shielding film and the surface of the semiconductor film is not more than 1 μm.

4. A method for manufacturing a semiconductor device according to claim 1, wherein the light-shielding film comprises a metal film.

5. A method for manufacturing a semiconductor device according to claim 1, wherein the light-shielding film comprises an insulating film.

6. A method for manufacturing a semiconductor device according to claim 1, wherein the laser oscillator is a continuous wave solid laser.

7. A method for manufacturing a semiconductor device according to claim 1, wherein the laser oscillator is one kind or plural kinds selected from the group consisting of YAG laser, $YVO_4$ laser, YLF laser, $YAlO_3$ laser, $Y_2O_3$ laser, alexandrite laser, and Ti: Sapphire laser.

8. A method for manufacturing a semiconductor device according to claim 1, wherein the laser oscillator is one kind or plural kinds selected from the group consisting of continuous wave Ar laser, continuous wave Kr laser, and continuous wave $CO_2$ laser.

9. A method for manufacturing a semiconductor device according to claim 1, wherein the laser beam is higher harmonic.

10. A method for manufacturing a semiconductor device according to claim 1, wherein the substrate is set on a stage for moving the substrate.

11. A method for manufacturing a semiconductor device, comprising:
    forming a non-single crystal semiconductor film over a substrate;
    forming an anti-contamination film on the non-single crystal semiconductor film;
    providing a light-shielding film with an opening on the anti-contamination film;
    shaping a laser beam emitted from a laser oscillator to become a beam spot on a surface to be irradiated; and
    performing laser annealing to the non-single crystal semiconductor film through the opening of the light-shielding film while relatively moving the substrate in a direction of a minor axis of the beam spot, p1 wherein the beam spot has one of a linear shape and an elliptical shape,
    wherein a surface of the non-single crystal semiconductor film is the surface to be irradiated,
    wherein a portion of the beam spot is shielded with the light-shielding film while the laser annealing to the non-single crystal semiconductor film is performed, and
    wherein the portion of the beam spot has a lower energy density than the center of the beam spot.

12. A method for manufacturing a semiconductor device according to claim 11, wherein a distance between a surface of the light-shielding film and the surface of the semiconductor film is not more than 10 μm.

13. A method for manufacturing a semiconductor device according to claim 11, wherein a distance between a surface of the light-shielding film and the surface of the semiconductor film is not more than 1 μm.

14. A method for manufacturing a semiconductor device according to claim 11, wherein the light-shielding film comprises a metal film.

15. A method for manufacturing a semiconductor device according to claim 11, wherein the light-shielding film comprises an insulating film.

16. A method for manufacturing a semiconductor device according to claim 11, wherein the anti-contamination film comprises a silicon oxide film.

17. A method for manufacturing a semiconductor device according to claim 11, wherein the laser oscillator is a continuous wave solid laser.

18. A method for manufacturing a semiconductor device according to claim 11, wherein the laser oscillator is one kind or plural kinds selected from the group consisting of YAG laser, $YVO_4$ laser, YLF laser, $YAlO_3$ laser, $Y_2O_3$ laser, alexandrite laser, and Ti: Sapphire laser.

19. A method for manufacturing a semiconductor device according to claim 11, wherein the laser oscillator is one kind or plural kinds selected from the group consisting of continuous wave Ar laser, continuous wave Kr laser, and continuous wave $CO_2$ laser.

20. A method for manufacturing a semiconductor device according to claim 11, wherein the laser beam is higher harmonic.

21. A method for manufacturing a semiconductor device according to claim 11, wherein the substrate is set on a stage for moving the substrate.

22. A method for manufacturing a semiconductor device, comprising:
   forming a semiconductor film over a substrate;
   providing a light-shielding film with an opening over the semiconductor film;
   shaping a laser beam emitted from a laser oscillator into a linear or an elliptical beam spot; and
   irradiating the laser beam to the semiconductor film through the opening of the light-shielding film while relatively moving the substate in a direction of a minor axis of the beam spot,
   wherein a portion of the laser beam is shielded with the light-shielding film and the portion has a lower energy density than the center of the laser beam.

23. A method for manufacturing a semiconductor device according to claim 22, wherein the laser beam has one of a linear shape and an elliptical shape.

24. A method for manufacturing a semiconductor device according to claim 22, wherein a distance between a surface of the light-shielding film and a surface of the semiconductor film is not more than 10 µm.

25. A method for manufacturing a semiconductor device according to claim 22, wherein a distance between a surface of the light-shielding film and a surface of the semiconductor film is not more than 1 µm.

26. A method for manufacturing a semiconductor device according to claim 22, wherein the light-shielding film comprises a metal film.

27. A method for manufacturing a semiconductor device according to claim 22, wherein the light-shielding film comprises an insulating film.

28. A method for manufacturing a semiconductor device according to claim 22, wherein the laser beam is emitted from a continuous wave solid laser.

29. A method for manufacturing a semiconductor device according to claim 22, wherein the laser beam is emitted from one kind or plural kinds selected from the group consisting of YAG laser, $YVO_4$ laser, YLF laser, $YAlO_3$ laser, $Y_2O_3$ laser, alexandrite laser, and Ti: Sapphire laser.

30. A method for manufacturing a semiconductor device according to claim 22, wherein the laser beam is emitted from one kind or plural kinds selected from the group consisting of continuous wave Ar laser, continuous wave Kr laser, and continuous wave $CO_2$ laser.

31. A method for manufacturing a semiconductor device according to claim 22, wherein the laser beam is higher harmonic.

32. A method for manufacturing a semiconductor device according to claim 22, wherein the substrate is set on a stage for moving the substrate.

33. A method for manufacturing a semiconductor device comprising:
   forming a semiconductor film over a substrate;
   providing a light-shielding film with an opening on the semiconductor film;
   shaping a laser beam emitted from a laser oscillator into a linear or an elliptical beam spot; and
   irradiating the laser beam to the semiconductor film through the opening of the light-shielding film while relatively moving the substrate in a direction of a minor axis of the beam spot,
   wherein a distance between a surface of the light-shielding film and a surface of the semiconductor film is not more than 10 µm, and
   wherein a portion of the laser beam is shielded with the light-shielding film and the portion has a lower energy density than the center of the laser beam.

34. A method for manufacturing a semiconductor device according to claim 33, wherein the laser beam has one of a linear shape and an elliptical shape.

35. A method for manufacturing a semiconductor device according to claim 33, wherein a distance between a surface of the light-shielding film and the surface of the semiconductor film is not more than 1 µm.

36. A method for manufacturing a semiconductor device according to claim 33, wherein the light-shielding film comprises a metal film.

37. A method for manufacturing a semiconductor device according to claim 33, wherein the light-shielding film comprises an insulating film.

38. A method for manufacturing a semiconductor device according to claim 33, wherein the laser beam is emitted from a continuous wave solid laser.

39. A method for manufacturing a semiconductor device according to claim 33, wherein the laser beam is emitted from one kind or plural kinds selected from the group consisting of YAG laser, $YVO_4$ laser, YLF laser, $YAlO_3$ laser, $Y_2O_3$ laser, alexandrite laser, and Ti: Sapphire laser.

40. A method for manufacturing a semiconductor device according to claim 33, wherein the laser beam is emitted from one kind or plural kinds selected from the group consisting of continuous wave Ar laser, continuous wave Kr laser, and continuous wave $CO_2$ laser.

41. A method for manufacturing a semiconductor device according to claim 33, wherein the laser beam is higher harmonic.

42. A method for manufacturing a semiconductor device according to claim 33, wherein the substrate is set on a stage for moving the substrate.

43. A method for manufacturing a semiconductor device, comprising:
   forming a semiconductor film over a substrate;
   providing a light-shielding film with an opening on the semiconductor film; and
   irradiating a laser beam to the semiconductor film through the opening of the light-shielding film while realtively moving the substrate in a direction of a minor axis of a beam spot of the laser beam,
   wherein a portion of the laser beam is shielded with the light-shielding film and the portion has a lower energy density than the center of the laser beam.

44. A method for manufacturing a semiconductor device according to claim 43, wherein the laser beam has one of a linear shape and an elliptical shape.

45. A method for manufacturing a semiconductor device according to claim 43, wherein a distance between a surface of the light-shielding film and a surface of the semiconductor film is not more than 10 µm.

46. A method for manufacturing a semiconductor device according to claim 43, wherein a distance between a surface of the light-shielding film and a surface of the semiconductor film is not more than 1 µm.

47. A method for manufacturing a semiconductor device according to claim 43, wherein the light-shielding film comprises a metal film.

48. A method for manufacturing a semiconductor device according to claim 43, wherein the light-shielding film comprises an insulating film.

49. A method for manufacturing a semiconductor device according to claim 43, wherein the laser beam is emitted from a continuous wave solid laser.

50. A method for manufacturing a semiconductor device according to claim 43, wherein the laser beam is emitted from one kind or plural kinds selected from the group consisting of YAG laser, $YVO_4$ laser, YLF laser, $YAlO_3$ laser, $Y_2O_3$ laser, alexandrite laser, and Ti: Sapphire laser.

51. A method for manufacturing a semiconductor device according to claim 43, wherein the laser beam is emitted from one kind or plural kinds selected from the group consisting of continuous wave Ar laser, continuous wave Kr laser, and continuous wave $CO_2$ laser.

52. A method for manufacturing a semiconductor device according to claim 43, wherein the laser beam is higher harmonic.

53. A method for manufacturing a semiconductor device according to claim 43, wherein the substrate is set on a stage for moving the substrate.

54. A method for manufacturing a semiconductor device comprising:
 forming a semiconductor film over a substrate;
 providing a light-shielding film with an opening on the semiconductor film; and
 irradiating a laser beam to the semiconductor film through the opening of the light-shielding film while relatively moving the substrate in a direction of a minor axis of a beam spot of the laser beam,
 wherein a distance between a surface of the light-shielding film and a surface of the semiconductor film is not more than 10 µm, and
 wherein a portion of the laser beam is shielded with the light-shielding film and the portion has a lower energy density than the center of the laser beam.

55. A method for manufacturing a semiconductor device according to claim 54, wherein the laser beam has one of a linear shape and an elliptical shape.

56. A method for manufacturing a semiconductor device according to claim 54, wherein a distance between a surface of the light-shielding film and the surface of the semiconductor film is not more than 1 µm.

57. A method for manufacturing a semiconductor device according to claim 54, wherein the light-shielding film comprises a metal film.

58. A method for manufacturing a semiconductor device according to claim 54, wherein the light-shielding film comprises an insulating film.

59. A method for manufacturing a semiconductor device according to claim 54, wherein the laser beam is emitted from a continuous wave solid laser.

60. A method for manufacturing a semiconductor device according to claim 54, wherein the laser beam is emitted from one kind or plural kinds selected from the group consisting of YAG laser, $YVO_4$ laser, YLF laser, $YAlO_3$ laser, $Y_2O_3$ laser, alexandrite laser, and Ti: Sapphire laser.

61. A method for manufacturing a semiconductor device according to claim 54, wherein the laser beam is emitted from one kind or plural kinds selected from the group consisting of continuous wave Ar laser, continuous wave Kr laser, and continuous wave $CO_2$ laser.

62. A method for manufacturing a semiconductor device according to claim 54, wherein the laser beam is higher harmonic.

63. A method for manufacturing a semiconductor device according to claim 54, wherein the substrate is set on a stage for moving the substrate.

* * * * *